United States Patent
Weiszl

(10) Patent No.: US 10,921,576 B2
(45) Date of Patent: Feb. 16, 2021

(54) ADJUSTING TURRET FOR A LONG-RANGE OPTICAL DEVICE

(71) Applicant: Kahles Gesellschaft m.b.H., Guntramsdorf (AT)

(72) Inventor: Gunther Weiszl, Moellersdorf (AT)

(73) Assignee: Kahles Gesellschaft m.b.H., Guntramsdorf (AT)

( * ) Notice: Subject to any disclaimer, the term of this patent is extended or adjusted under 35 U.S.C. 154(b) by 469 days.

(21) Appl. No.: 15/827,051

(22) Filed: Nov. 30, 2017

(65) Prior Publication Data

US 2018/0157025 A1   Jun. 7, 2018

(30) Foreign Application Priority Data

Dec. 1, 2016   (AT) .............. A 51092/2016

(51) Int. Cl.
| G02B 23/16 | (2006.01) |
| G02B 21/24 | (2006.01) |
| G02B 7/16  | (2021.01) |
| F16M 11/20 | (2006.01) |

(52) U.S. Cl.
CPC ......... G02B 23/16 (2013.01); F16M 11/2014 (2013.01); G02B 7/16 (2013.01); G02B 21/248 (2013.01)

(58) Field of Classification Search
CPC ........ G02B 23/16; G02B 7/16; G02B 21/248; F16M 11/2014; F41G 1/38; F41G 1/16
USPC ....................................................... 359/399
See application file for complete search history.

(56) References Cited

U.S. PATENT DOCUMENTS

| 6,351,907 | B1  | 3/2002  | Otteman |
| 6,995,905 | B2  | 2/2006  | Wagner |
| 7,612,952 | B2  | 11/2009 | Schaefer |
| 7,742,228 | B2  | 6/2010  | Fiedler |
| 7,997,163 | B2  | 8/2011  | Casas |
| 8,270,104 | B2  | 9/2012  | Windauer |
| 8,848,287 | B2  | 9/2014  | Schmitt et al. |
| 9,188,408 | B2  | 11/2015 | Huynh |
| 9,958,235 | B2* | 5/2018  | Lassak ............ F41G 1/38 |

(Continued)

FOREIGN PATENT DOCUMENTS

| DE | 29720737 U1 | 2/1998 |
| DE | 10 2006 016 834 A1 | 10/2007 |

(Continued)

*Primary Examiner* — Stephone B Allen
*Assistant Examiner* — Rahman Abdur
(74) *Attorney, Agent, or Firm* — Collard & Roe, P.C.

(57) ABSTRACT

An adjusting turret for a long-range optical device, in particular a telescopic sight, includes a rotary cap rotatable about a rotary axis and at least one locking ring having a toothing and at least one locking element cooperating permanently with the toothing. The at least one locking element is moved by rotating the rotary cap out of a first, non-locked engagement position, in which the at least one locking element is in engagement with a first portion of the toothing of the at least one locking ring, overcoming a rotary resistance produced by the force of at least one elastic element into a second, non-locked engagement position, in which the at least one locking element is moved into engagement with a second, portion of the toothing of the locking ring. The adjusting turret includes at least one adjusting element in particular for the stepless adjustment of the rotary resistance.

6 Claims, 3 Drawing Sheets

(56) References Cited

U.S. PATENT DOCUMENTS

| | | | |
|---|---|---|---|
| 2015/0070758 A1* | 3/2015 | Ingenito | F41G 1/38 |
| | | | 359/399 |
| 2016/0178323 A1 | 6/2016 | Öttl | |
| 2018/0120059 A1 | 5/2018 | White et al. | |

FOREIGN PATENT DOCUMENTS

| | | |
|---|---|---|
| DE | 10 2010 060 343 A1 | 5/2011 |
| EP | 1 746 451 B1 | 1/2007 |
| EP | 2 466 245 A2 | 6/2012 |
| WO | 02/082003 A2 | 10/2002 |
| WO | 2010/008810 A2 | 1/2010 |

\* cited by examiner

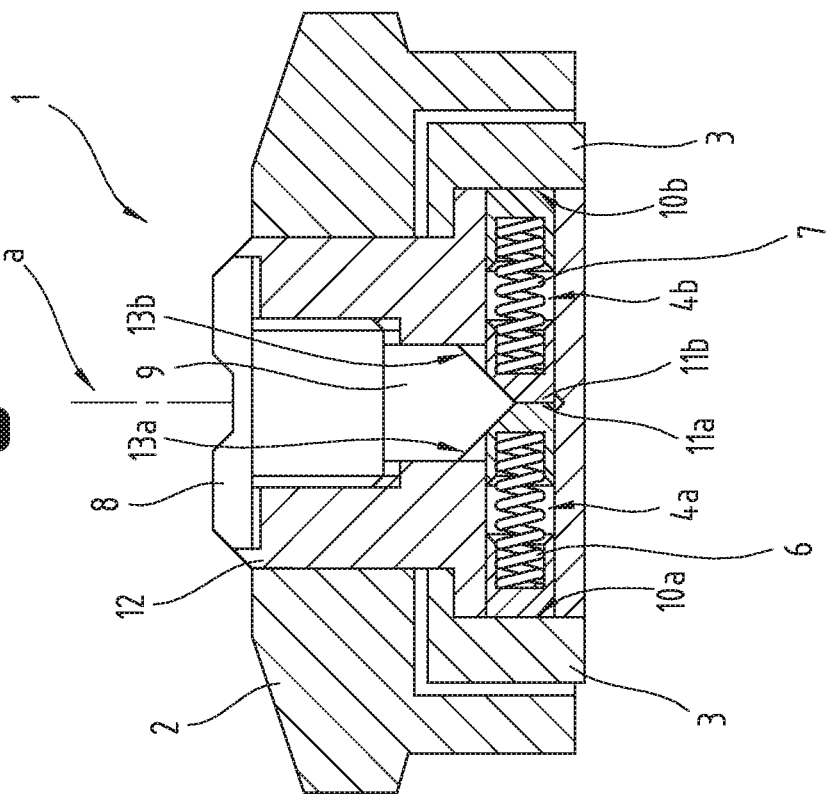
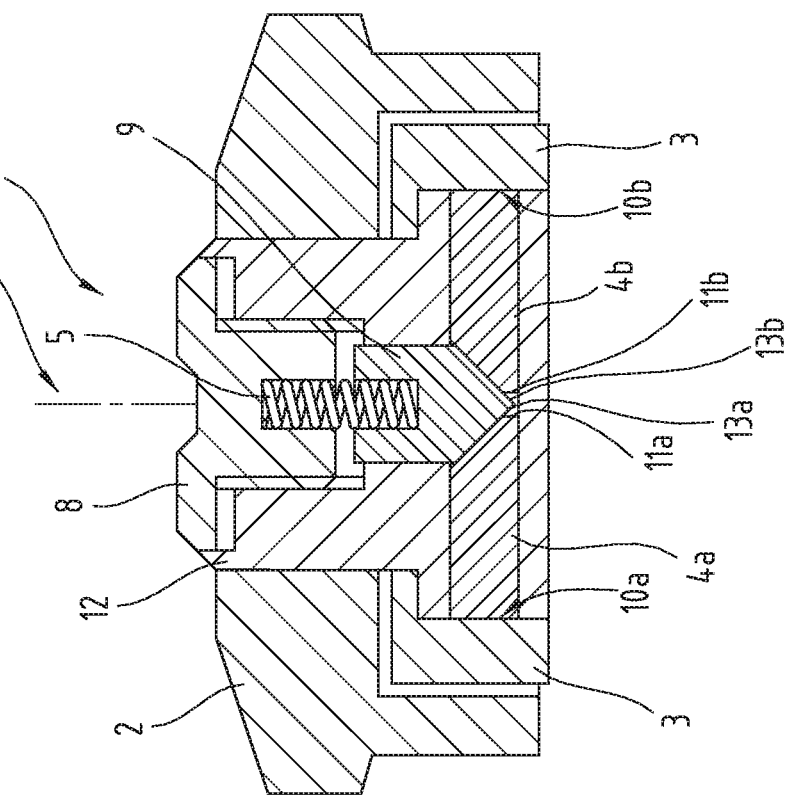

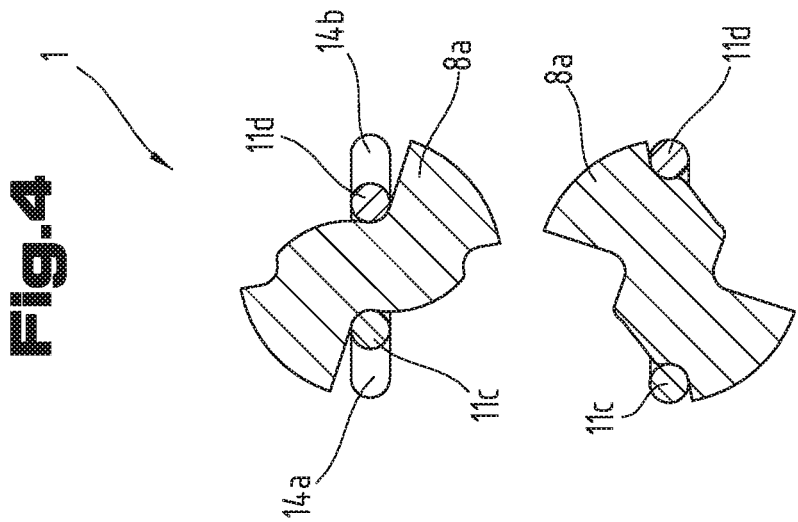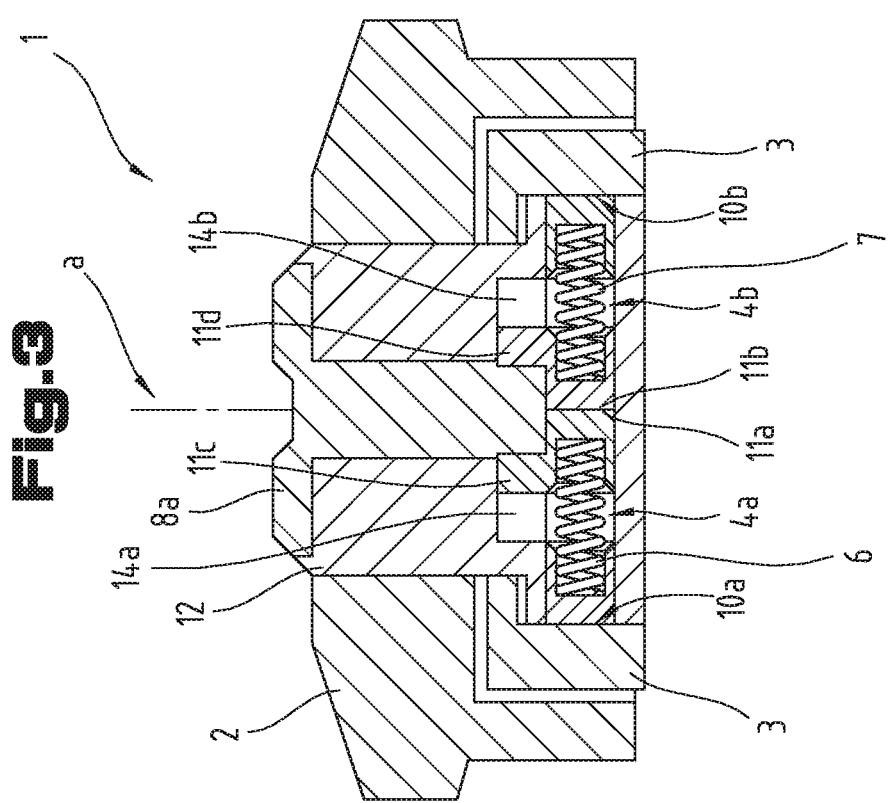

ADJUSTING TURRET FOR A LONG-RANGE OPTICAL DEVICE

CROSS REFERENCE TO RELATED APPLICATIONS

Applicant claims priority under 35 U.S.C. § 119 of Austrian Application No. A51092/2016 filed on Dec. 1, 2016, the disclosure of which is incorporated by reference.

BACKGROUND OF THE INVENTION

1. Field of the Invention

The invention relates to an adjusting turret for a long-range optical device, in particular for a telescopic sight, wherein the adjusting turret comprises a rotary cap rotatable about a rotary axis and at least one detent ring with a toothing and at least one detent element permanently cooperating with the toothing of the at least one detent ring, wherein the at least one detent element is moved by rotating the rotary cap out of a first, non-locked engagement position, in which the at least one detent element is moved into engagement with a first portion of the toothing of the at least one detent ring, overcoming a rotary resistance produced by the force of at least one elastic element into a second, non-locked engagement position, in which the at least one detent element is moved into engagement with a second portion of the toothing of the detent ring.

2. Description of the Related Art

Adjusting turrets of the aforementioned kind are usually used for adjusting a line of sight in vertical or horizontal direction. Adjusting turrets of this kind make a click upon rotation which can be clearly perceived by the user and is caused by forcing out and re-engaging the detent element into the toothing. Each rotation by one click corresponds here to a defined lateral or height adjustment of the line of sight. An adjusting turret with a click adjustment is known for example from DE29720737U1.

The disadvantage of known adjusting turrets is however that with the rotation of the turret the rotary resistance perceived as "click hardness" always remains constant regardless of the user or conditions of use. This can be a disadvantage in many situations, for example when using the adjusting turret with gloves. Different users can also have different preferences for the click hardness.

SUMMARY OF THE INVENTION

It is therefore an objective of the invention to overcome the aforementioned disadvantages of known solutions and enable a simple and reliable adjustment of the click hardness.

Said objective is achieved by an adjusting turret of the aforementioned kind according to the invention in that the adjusting turret comprises at least one adjusting element, in particular for the stepless adjustment of the rotary resistance.

The solution according to the invention enables a stepless adaptation and adjustment of the desired click hardness by a user. Thus the user can individually adjust the force required for the rotation of the adjusting turret by one click. The adjusting turret thus always remains rotatable and only the rotary resistance changes.

According to an advantageous variant of the invention by activating the at least one adjusting element the hardness of the at least one elastic element and/or the pretensioning of the at least one elastic element is adjusted.

Preferably, the detent element is mounted displaceably perpendicular to the rotary axis of the rotary cap.

The operation can be made simple in that the at least one adjusting element can be displaced parallel to or perpendicular to or obliquely to or radially to the rotary axis of the rotary cap.

In addition, the at least one detent element can be loaded by at least one force acting perpendicular to or obliquely to the rotary axis produced by the at least one elastic element.

Furthermore, the adjusting turret can comprise at least one force-transmitting element connected directly or indirectly to the at least one adjusting element, cooperating with at least one end facing away from the detent ring of the at least one detent element.

The force-transmitting element can be arranged to be displaced parallel to and/or along and/or rotationally to the rotary axis of the rotary cap and is designed to taper towards an end facing the detent element forming an edge, wherein the edge forms a run-on surface for the end of the detent element facing away from the detent ring.

Furthermore, the force-transmitting element can be loaded at least by at least one force acting parallel to the direction of the rotary axis of the rotary cap and produced by the at least one elastic element.

Preferably, the at least one detent element comprises at least one front part engaging in the toothing of the detent ring and at least one rear part facing away from the detent ring, wherein between the front and the rear part at least one spring is held and the front part is mounted displaceably against the rear part.

BRIEF DESCRIPTION OF THE DRAWINGS

For a better understanding of the invention the latter is explained in more detail with reference to the following Figures.

In a much simplified, schematic representation:

FIG. 1 is a cross-section of a first variant of an adjusting turret according to the invention;

FIG. 2 is a cross-section of a second variant of an adjusting turret according to the invention;

FIG. 3 is a cross-section of a third variant of an adjusting turret according to the invention;

FIG. 4 is a force-transmitting element of the variant of the adjusting turret shown in FIG. 3 in two different positions;

DETAILED DESCRIPTION OF THE PREFERRED EMBODIMENTS

Figure 5:
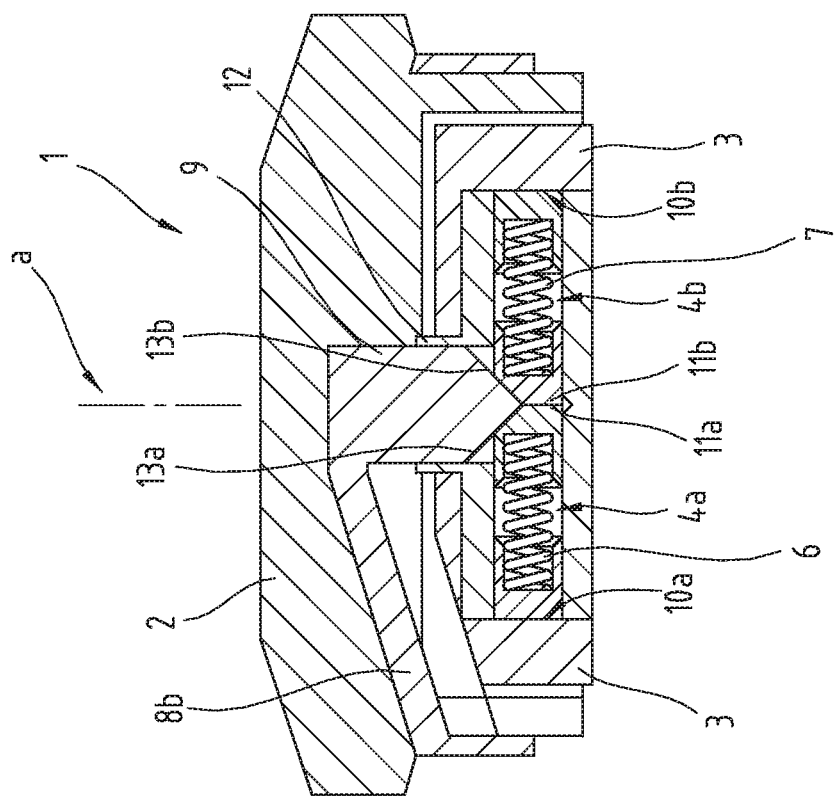
FIG. 5 is a cross-section of a fourth variant of an adjusting turret according to the invention.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

According to FIG. 1 an adjusting turret 1 according to the invention for a long-range optical device, in particular for a telescopic sight, comprises a rotary cap 2 rotatable about a rotary axis. In addition, the adjusting turret 1 comprises a detent ring 3 with a toothing and at least one detent element 4a, 4b permanently cooperating with the toothing of the detent ring 3. The adjusting turret 1 can, as shown, comprise two or more similarly designed detent elements 4a, 4b. The detent elements 4a, 4b can be designed to be pin-like, as shown in FIG. 1.

By rotating the rotary cap 2 the detent elements 4a, 4b are moved respectively out of a first engagement position, in which the detent elements 4a, 4b are in engagement with a first portion of the toothing of the detent ring 3, into a second engagement position in which the detent elements 4a, 4b are in engagement respectively with a second portion of the toothing of the detent ring 3. The detent elements 4a, 4b can each comprise a front part 10a, 10b engaging in the toothing of the detent ring 3 and at least one rear part 11a, 11b facing away from the detent ring 3. Rotating the detent elements 4a, 4b further about a tooth of the toothing of the detent ring 3 corresponds here to one "click". In order to rotate the detent elements 4a, 4b further by one click, the rotary resistance produced by the force of at least one elastic, preferably spring-like, element has to be overcome. The elastic element is formed in the shown embodiment by at least one spring 5. The at least one spring 5 acts on the at least one detent element 4, 4b. The force of the spring 5 defines how strongly the detent element 4a, 4b is pressed against the detent ring 3.

The spring 5 can be for example a helical spring, plate spring, air spring, leaf spring etc.

The rotary cap 2 can be connected in a rotationally secure manner to an element 12 on or in which the detent element 4a, 4b is displaceably mounted. For example, the detent element 4a, 4b can be mounted displaceably in a bore of the element 12. Preferably, the detent element 4a, 4b is mounted displaceably perpendicular to the rotary axis a of the rotary cap 2.

The element 12 can in turn be part of a spindle, which acts on an optical system of the telescopic sight. By activating the rotary cap 2 the detent element 4 can be rotated relative to the detent ring 3. The detent ring 3 can hereby remain stationary relative to a surface of the telescopic sight.

The adjusting turret 1 comprises one or more adjusting elements 8 for the stepless adjustment of the rotary resistance. By means of the adjusting element 8 a spring hardness of the spring 5 and/or a pretensioning of the spring 5 can be varied steplessly. As in the embodiment shown here, the adjusting element 8 can be designed as a steplessly rotatable screw, in or on which the spring 5 is mounted. By activating the screw the latter is displaced parallel to the rotary axis, whereby the pretensioning of the spring 5 is adjusted. The spring 5 can act on a force-transmitting element 9 which is connected by the spring 5 indirectly to the adjusting element 8. The force-transmitting element 9 cooperates respectively with the ends 11a, 11b of the detent elements 4a, 4b facing away from the detent ring 3.

The force-transmitting element 9 can be displaced to be parallel to the rotary axis a of the rotary cap 2. The force-transmitting element 9 tapers towards one end facing the detent elements 4a, 4b forming two edges 13a, 13b, which each form a run-on surface for the ends 11a, 11b of the detent elements 4a, 4b facing away from the detent ring 3. By means of the force-transmitting element 9 the detent elements 4a, 4b are pressed in a detent position against the detent ring 3 by a force produced by the spring 5. On rotating the rotary cap 2 the detent elements 4a, 4b are forced out of the toothing of the detent ring 3. In this way the detent elements 4a, 4b are moved in the direction of the force-transmitting element 9 and push the latter upwards along the rotary axis a, whereby there is a compression of the spring 5. By changing the pretensioning or hardness of the spring 5 by means of the adjusting element 8 the spring force to be overcome can be changed and thus the rotary resistance can be adjusted.

FIG. 2 shows a further and possibly independent embodiment of the adjusting turret 1, wherein the same reference numerals and component parts are used for the same parts as in the preceding FIG. 1. To avoid unnecessary repetition reference is made to the detailed description of the preceding FIG. 1.

As shown in FIG. 2, each of the detent elements 4a, 4b can also be designed to have multiple parts, wherein between the front part 10a, 10b and the rear part 11a, 11b of each of the detent elements 4a, 4b a spring 6 and 7 can be arranged. By rotating the rotary cap 2 one click the front part 10a, 10b of the respective detent element 4a, 4b is moved against the corresponding rear part 11a, 11b and thus compresses the springs 6 and 7. In the shown case by means of the force-distributing element 9 on activating the adjusting element 8 designed here in the form of a screw the pretensioning or hardness of the springs 6 and 7 can be adjusted. On rotating the screw used as an adjusting element 8 the latter is displaced along the rotary axis a and also causes the displacement of the force-distributing element 9 along said rotary axis a. By means of the edges 13a, 13b used as run-on surfaces the parts 11a and 11b are displaced perpendicular to the rotary axis a and the springs 6 and 7 are compressed.

It should be noted at this point however that a combination of the embodiments shown in FIG. 1 and FIG. 2 is also possible. Thus in the embodiment shown in FIG. 2 a spring 5 can also be provided. By means of a combination of springs 5, 6 and 7 a particularly effective spring characteristic curve can be achieved for the resulting total spring. It should also be noted that the springs 6 and 7, even if the latter are screw springs, can also be designed differently, for example as helical springs, air springs etc. In addition, it should be noted that one of the detent elements 4a, 4b can also be designed in two parts and the other one can be designed as a one-piece pin. Furthermore, in order to implement the invention in all of the embodiments it is also possible to provide only a single detent element 4a or 4b.

FIGS. 3 and 4 show a further and possibly independent embodiment of the adjusting turret 1, wherein in turn for the same parts the same reference numerals and component names are used as in the preceding Figures. To avoid unnecessary repetition, reference is made to the detailed description in the preceding figures.

In the embodiment shown in FIG. 3 the adjusting element 8a on its lower section used as a force-transmitting element can have a cross-section, as shown in FIG. 4. FIG. 4 shows the force-transmitting element and the adjusting element 8 designed in one piece. Furthermore, the ends 11a, 11b can have extensions 11c, 11d which are displaceable in radial direction in recesses 14a, 14b forming a slide. By rotating the adjusting element 8a or force-transmitting means acting on the extensions 11c and 11d about the rotary axis a the extensions 11c and 11d are displaced along the recesses 14a, 14 and thus the respective spring 6, 7 is pretensioned by moving the sections 11a, 11b in the direction of sections 10a, 10b. Side surfaces of the adjusting elements 8a cooperating with the extensions 11c, 11d here form run-off curves for the extensions 11c, 11d. In the upper view shown in FIG. 4 the springs 6 and 7 are pretensioned to a maximum relaxed position, whereas in the lower view of FIG. 4 the springs 6 and 7 are pretensioned to the maximum.

FIG. 5 shows an additional and possibly independent embodiment of the adjusting turret 1, wherein the same reference numerals and component names are used for the same parts as in the preceding Figures. To avoid unnecessary repetition, reference is made to the detailed description of the preceding figures.

The embodiment according to FIG. 5 corresponds essentially to that of FIG. 2 with the difference that the adjusting element 8b is designed in one piece with the force-transmitting element 9 and is mounted displaceably on a side surface of the adjusting turret 1 in a direction parallel to the rotary axis a. The adjusting element 8b can be designed for example as a ring, which is taken up by a user and can be lifted and lowered relative to the detent elements 4a, 4b. As the force-transmitting element 9 follows this movement due to the one-piece design with the adjusting element 8b, in this way by means of the force-transmitting element 9 the pretensioning or hardness of the springs 6 and 7 can be adjusted.

Lastly, as a point of formality it should be noted that for a better understanding of the structure the elements have in part not been illustrated to scale and/or have been enlarged and/or reduced in size.

LIST OF REFERENCE NUMERALS 1 adjusting turret
2 rotary cap
3 locking ring
4a, b locking element
5 spring
6 spring
7 spring
8, 8a, 8b adjusting element
9 force-transmitting element
10a, b front part
11a, b rear part
12 element
13a, b edge
14a, b recesses

The invention claimed is:

1. An adjusting turret for a telescopic sight,
wherein the adjusting turret comprises a rotary cap rotatable about a rotary axis and a detent ring having a toothing and a detent element permanently cooperating with the toothing of the detent ring,
wherein the detent element is moved by rotating the rotary cap out of a first, non-locked engagement position, in which the detent element is moved into engagement with a first portion of the toothing of the detent ring, overcoming a rotary resistance produced by the force of an elastic element into a second, non-locked engagement position, in which the detent element is moved into engagement with a second portion of the toothing of the detent ring,
wherein the adjusting turret comprises an adjusting element and a force-transmitting element,
wherein the force-transmitting element is connected to the adjusting element and cooperates with an end of the detent element facing away from the detent ring,
wherein the force-transmitting element is loaded by a force acting parallel to the direction of the rotary axis of the rotary cap and produced by the elastic element,
wherein the force-transmitting element can be displaced parallel and/or along and/or rotationally to the rotary axis of the rotary cap, and is designed to taper towards an end facing the detent element forming an edge, and
wherein the edge forms a run-on surface for the end of the detent element facing away from the detent ring.

2. The adjusting turret according to claim 1,
wherein the adjusting element is configured for the stepless adjustment of the rotary resistance by adjusting the hardness or pretensioning of the elastic element.

3. The adjusting turret as claimed in claim 1, wherein the detent element is mounted to be displaceable perpendicular to the rotary axis of the rotary cap.

4. The adjusting turret as claimed in claim 1, wherein the adjusting element can be displaced parallel to or perpendicular to or obliquely or radially to the rotary axis of the rotary cap.

5. The adjusting turret as claimed in claim 1, wherein the detent element comprises a front part engaging in the toothing of the detent ring and a rear part facing away from the detent ring, wherein between the front and the rear part at least one spring is held and the front part is mounted displaceably against the rear part.

6. The adjusting turret as claimed in claim 1, wherein the elastic element is a spring.

* * * * *